US008913205B2

(12) United States Patent
Robinson et al.

(10) Patent No.: US 8,913,205 B2
(45) Date of Patent: Dec. 16, 2014

(54) SPLIT SEGMENTED LIQUID CRYSTAL MODULATOR

(75) Inventors: Michael G. Robinson, Boulder, CO (US); Terry W. Norton, Denver, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/279,276

(22) Filed: Oct. 22, 2011

(65) Prior Publication Data
US 2012/0099040 A1 Apr. 26, 2012

Related U.S. Application Data

(60) Provisional application No. 61/406,018, filed on Oct. 22, 2010.

(51) Int. Cl.
*G02F 1/141* (2006.01)
*G02F 1/133* (2006.01)
*G02B 5/30* (2006.01)

(52) U.S. Cl.
CPC .......... *G02B 5/3025* (2013.01); *G02F 1/13306* (2013.01)
USPC ................. 349/37; 349/15; 349/96; 359/245; 359/316; 359/484.01; 359/477; 359/246; 348/51; 348/E13.001; 345/102; 345/419; 345/204; 345/87

(58) Field of Classification Search
CPC ...................................... G09G 3/36
USPC ............................ 349/37, 15; 359/484.01, 316
See application file for complete search history.

(56) References Cited

U.S. PATENT DOCUMENTS

| 4,792,850 | A | * | 12/1988 | Liptoh et al. ..................... 348/57 |
| 4,870,486 | A | * | 9/1989 | Nakagawa et al. ............. 349/15 |
| 5,991,074 | A | * | 11/1999 | Nose et al. ..................... 359/465 |
| 6,046,715 | A | * | 4/2000 | Towler et al. ................... 345/95 |
| 6,281,866 | B1 | * | 8/2001 | Robinson et al. ............... 345/87 |
| 2007/0008406 | A1 | * | 1/2007 | Shestak et al. .................. 348/58 |
| 2007/0195163 | A1 | * | 8/2007 | Chestak et al. ................. 348/58 |
| 2008/0218459 | A1 | * | 9/2008 | Kim et al. ........................ 345/87 |

(Continued)

FOREIGN PATENT DOCUMENTS

| JP | 10123461 A | 5/1998 |
| JP | 11-282008 | * 10/1999 ............. G02F 1/136 |

(Continued)

OTHER PUBLICATIONS

International Report on Patentability dated Apr. 23, 2013 of PCT/US2011/057409.

(Continued)

*Primary Examiner* — Edward Glick
*Assistant Examiner* — Sang V Nguyen
(74) *Attorney, Agent, or Firm* — Darlene K. Kondo; Neil G. Mothew

(57) ABSTRACT

Disclosed is a segmented liquid crystal modulator panel apparatus and method for driving the same that overcomes electrical cross-talk associated with capacitive coupling to a common electrode. Each modulator segment may be divided into subsegments and driven substantially synchronously and out-of-phase. The field-polarity insensitive LC materials yield a substantially identical optical response for each subsegment, while allowing current on the common electrode to flow between the subsegments, thereby reducing power consumption and decreasing response times.

19 Claims, 4 Drawing Sheets

(56) References Cited

U.S. PATENT DOCUMENTS

| | | | |
|---|---|---|---|
| 2008/0316303 A1* | 12/2008 | Chiu et al. | 348/51 |
| 2009/0096943 A1* | 4/2009 | Uehara et al. | 349/37 |
| 2010/0039573 A1* | 2/2010 | Park et al. | 349/15 |
| 2010/0157027 A1* | 6/2010 | MacNaughton et al. | 348/53 |
| 2010/0238097 A1* | 9/2010 | Baik et al. | 345/87 |
| 2010/0271346 A1* | 10/2010 | Ku et al. | 345/204 |

FOREIGN PATENT DOCUMENTS

| | | |
|---|---|---|
| JP | 11282008 A | 10/1999 |
| JP | 2002101427 A | 4/2002 |
| JP | 2003167216 A | 6/2003 |
| KR | 1020070031517 A | 3/2007 |
| KR | 1020100091607 A | 8/2010 |

OTHER PUBLICATIONS

U.S. Appl. No. 12/853,274 by Robinson filed Aug. 9, 2010 entitled "Stereoscopic Flat Panel Display With Updated Blanking Intervals"; incorporated herein by reference.

U.S. Appl. No. 12/156,683 by Chiu filed Jun. 4, 2008 entitled "Display Device"; incorporated herein by reference.

International search report and written opinion of the international searching authority for PCT/US2011/057409 dated May 23, 2012.

* cited by examiner

SPLIT SEGMENTED LIQUID CRYSTAL MODULATOR

CROSS-REFERENCE TO RELATED APPLICATIONS

This application claims priority to U.S. Provisional Patent Application No. 61/406,018, filed Oct. 22, 2010, entitled "Split segmented liquid crystal modulator," the entirety of which is herein incorporated by reference.

TECHNICAL FIELD

This disclosure generally relates to addressing liquid crystal (LC) modulation devices and more specifically relates to addressing polarization control panels (PCP).

BRIEF SUMMARY

According to the present disclosure, a segmented polarization control panel, may include a first subsegment of a first segment of a segmented polarization control panel and a second subsegment of the first segment of the segmented polarization control panel, wherein the first subsegment may be driven with a waveform that may be opposite in polarity from the second subsegment. The segmented polarization control panel may include a second segment of the segmented polarization control panel, wherein the second segment may include a third subsegment and a fourth subsegment. Additionally, the segmented polarization control panel of may include a common electrode which may be coupled to the first segment and the second segment of the segmented polarization control panel.

The first segment and the second segment of the segmented polarization control panel may be electrically isolated from one another. The first subsegment of the first segment and the second subsegment of the first segment may be driven such that the waveforms may be substantially mirrored about the common electrode voltage. Further, the first subsegment and the second subsegment may be driven such that the first subsegment may exhibit substantially equivalent optical performance to the second subsegment and also may be driven substantially synchronously. The first subsegment may be approximately the same size as the second subsegment.

According to another aspect of the present disclosure, a method for driving a segmented modulator panel, may include driving a first subsegment of a first segment of the segmented modulator panel, with an opposite polarity from a second subsegment of the first segment. The first subsegment and the second subsegment may be driven such that the first subsegment exhibits substantially equivalent optical performance to the second subsegment and also substantially synchronously. The first and second subsegment may be driven such that the waveforms may be substantially mirrored about a common electrode voltage.

Additionally, the method may include driving the first segment of the segmented modulator panel substantially synchronously and out of relative phase with a second segment of the segmented modulator panel. The first segment and a second segment of the segmented modulator panel may be electrically isolated from one another and may both be coupled to a common electrode. The first subsegment and the second subsegment may be approximately the same size.

According to yet another aspect of the present disclosure, a segmented modulator panel may include a first segment of the segmented modulator panel and a second segment of the segmented modulator panel, and the first and second segment of the segmented modulator panel may be driven substantially synchronously and out of phase with each other. The first segment of the modulator panel may include a first subsegment and a second subsegment and the second segment of the modulator panel may include a third subsegment and a fourth subsegment. The first segment and the second segment may be electrically isolated from one another. Further, the first subsegment and the second subsegment may be driven such that the waveforms are substantially mirrored about the common electrode voltage.

Additionally disclosed is a segmented liquid crystal modulator panel apparatus and method for driving the same that overcomes electrical cross-talk associated with capacitive coupling to a common electrode. Each modulator segment is divided into two and driven synchronously and out-of-phase. The field-polarity insensitive LC materials may yield a substantially identical optical response for each subsegment, while allowing current on the common electrode to flow between the subsegments reducing power and decreasing response times.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
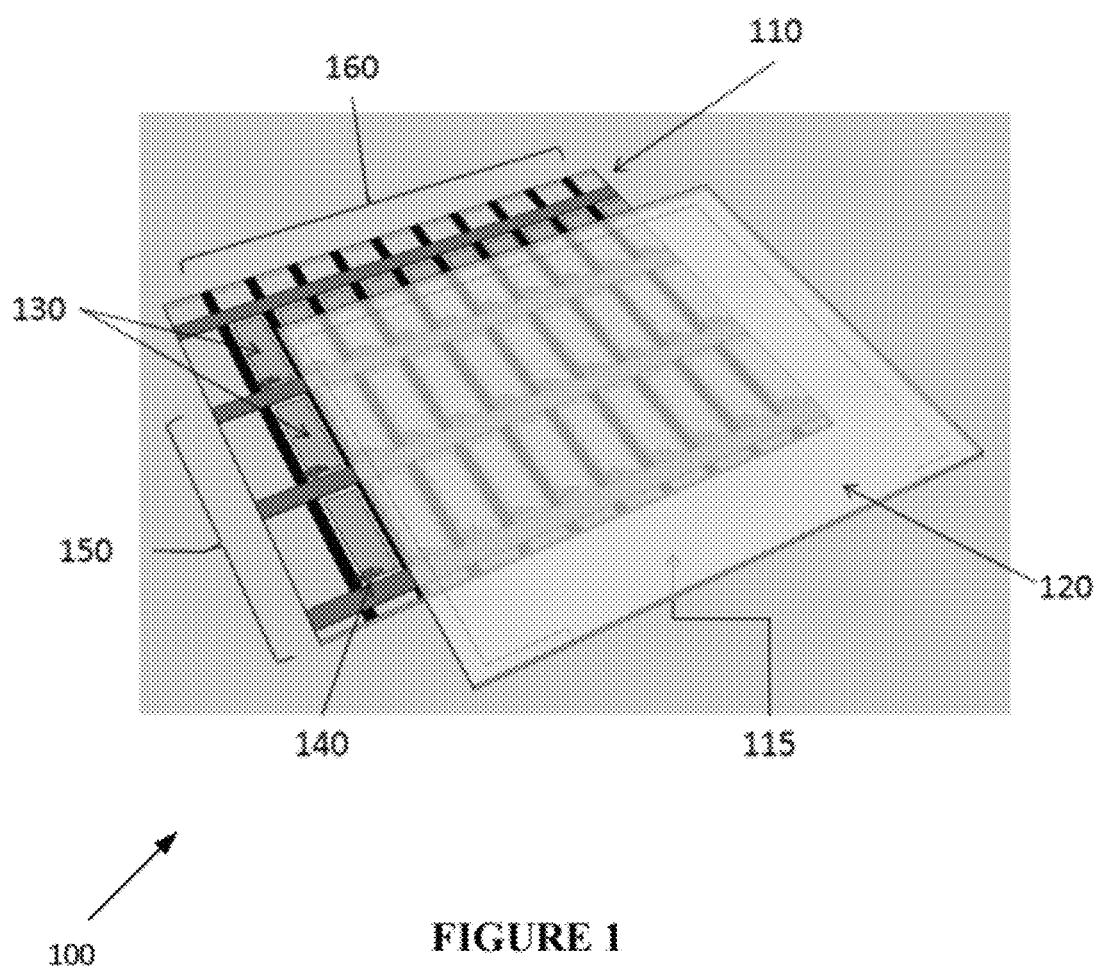
FIG. 1 is a schematic diagram of a liquid crystal display modulating panel.

Generally, one embodiment of the present disclosure may take the form of a segmented polarization control panel, may include a first subsegment of a first segment of a segmented polarization control panel and a second subsegment of the first segment of the segmented polarization control panel, wherein the first subsegment may be driven with a waveform that may be opposite in polarity from the second subsegment. The segmented polarization control panel may include a second segment of the segmented polarization control panel, wherein the second segment may include a third subsegment and a fourth subsegment. Additionally, the segmented polarization control panel of may include a common electrode which may be coupled to the first segment and the second segment of the segmented polarization control panel.

The first segment and the second segment of the segmented polarization control panel may be electrically isolated from one another. The first subsegment of the first segment and the second subsegment of the first segment may be driven such that the waveforms may be substantially mirrored about the common electrode voltage. Further, the first subsegment and the second subsegment may be driven such that the first subsegment may exhibit substantially equivalent optical performance to the second subsegment and also may be driven substantially synchronously. The first subsegment may be approximately the same size as the second subsegment.

According to another aspect of the present disclosure, a method for driving a segmented modulator panel, may include driving a first subsegment of a first segment of the segmented modulator panel, with an opposite polarity from a second subsegment of the first segment. The first subsegment and the second subsegment may be driven such that the first subsegment exhibits substantially equivalent optical performance to the second subsegment and also substantially synchronously. The first and second subsegment may be driven such that the waveforms may be substantially mirrored about a common electrode voltage.

Additionally, the method may include driving the first segment of the segmented modulator panel substantially synchronously and out of relative phase with a second segment of the segmented modulator panel. The first segment and a second segment of the segmented modulator panel may be electrically isolated from one another and may both be coupled to a common electrode. The first subsegment and the second subsegment may be approximately the same size.

According to yet another aspect of the present disclosure, a segmented modulator panel may include a first segment of the segmented modulator panel and a second segment of the segmented modulator panel, and the first and second segment of the segmented modulator panel may be driven substantially synchronously and out of phase with each other. The first segment of the modulator panel may include a first subsegment and a second subsegment and the second segment of the modulator panel may include a third subsegment and a fourth subsegment. The first segment and the second segment may be electrically isolated from one another. Further, the first subsegment and the second subsegment may be driven such that the waveforms are substantially mirrored about the common electrode voltage.

It should be noted that embodiments of the present disclosure may be used in a variety of optical systems and projection systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

FIG. 1 is a schematic diagram of a liquid crystal display modulating panel. The LCD modulating panel of FIG. 1 is one example of a current active matrix liquid crystal display ("AMLCD") panel 100. AMLCD panels may be used in various types of displays including, but not limited to, televisions, laptops, personal digital assistants, phones, smart phones, tablets, cameras, electronic readers, video game displays, and so forth. As illustrated in FIG. 1, the AMLCD panel addressing and composition may include a matrix of pixels 130 on a first substrate 110 and a common electrode 115 on a second substrate 120. The AMLCD 100 may include pixels 130 and local electric fields at each pixel may drive the LC into various modulation states that may manipulate polarized illuminating light, and which may allow a proportion of the light to pass through an exit analyzer. RGB color filters on adjacent modulating pixels may provide for full color images (not shown in FIG. 1).

Continuing the discussion of FIG. 1, the pixels 130 may modulate the light according to the respective individual pixel electrode voltages. A line-by-line addressing approach may be implemented to provide independent voltages to each of the individual pixels and the pixels may be driven asynchronously. As shown in FIG. 1, a thin film transistor (TFT) 140 may be associated with each of the pixels 130. Although a thin film transistor is discussed herein, other types of switching components may be used such as a diode. The TFTs 140 may act like a switch, and the ON/OFF state of the TFTs 140 may be controlled by row electrodes 150, in which each of the row electrodes 150 may be linked to all the pixels 130 in the respective row. Pixel voltage may be determined by the charge deposited on a local capacitor supplied via column data electrodes 160. The column data electrodes 160 may be connected in parallel with each of the pixels in the corresponding column. Lines may be addressed independently by turning on a single row of TFTs and depositing an appropriate charge in parallel through the column electrodes. In one embodiment, the row electrodes 150 may be oriented horizontally and the column data electrodes 160 may be oriented vertically.

As described with respect to FIG. 1, the voltages and hence deposited charge may be one polarity, either one of a positive or negative polarity. Stated differently, the field which may be created between the pixel voltage and the voltage on the common electrode may always be in one direction. However, this may lead to the migration of charged ions within the LC material toward one or the other of the electrodes. Undesired 'image sticking' may then result. Presently, all known commercial AMLCD panels reverse the field at each pixel between each displayed image, which does not affect the displayed image since the field direction of the LC materials are field direction copacetic.

In one example, field polarity inversion may be achieved by depositing more or less charge on the pixel electrode to give a voltage that swings to either side of the common electrode voltage. By alternating the field polarity between alternate pixel columns and/or rows of FIG. 1, the need to move charge macroscopically across the common electrode may be substantially removed. Additionally, a small to zero variation between adjacent pixel voltage levels may result.

Segmented Modulator Panels

Field polarity inversion may be applied to segmented LC modulator panels or polarization control panels ("PCPs"). The field polarity may be alternated over the LC and may not affect optical performance. The PCPs may be used in a light path following a LCD panel to modulate the polarization of light output to the viewer. PCPs may be distinct from LCDs in various ways, for example, PCPs may include a few macroscopic segments rather than millions of very small pixels driven asynchronously. Additionally, PCPs may not have a functional equivalent throughout the operating cycle, of the LCD with an adjacent pixel that allows local charge distribution to maintain the common electrode voltage.

In one embodiment, each segment may be driven independently, which may typically require charging and discharging the capacitor formed between the corresponding patterned electrode of the segment and the overlapping common electrode. While this can be disregarded on small panels, it may not be possible for large modulators such as PCPs that may be used with a RealD passive eyewear stereoscopic display system ("RPD"), examples of which are disclosed in commonly-owned U.S. application Ser. No. 12/853,274 entitled "Stereoscopic flat panel display with updated blanking intervals," filed Aug. 9, 2010, and U.S. application Ser. No. 12/156,683 entitled "Display Device," filed Jun. 4, 2008, all of which are herein incorporated by reference in their entirety.

Figure 2:
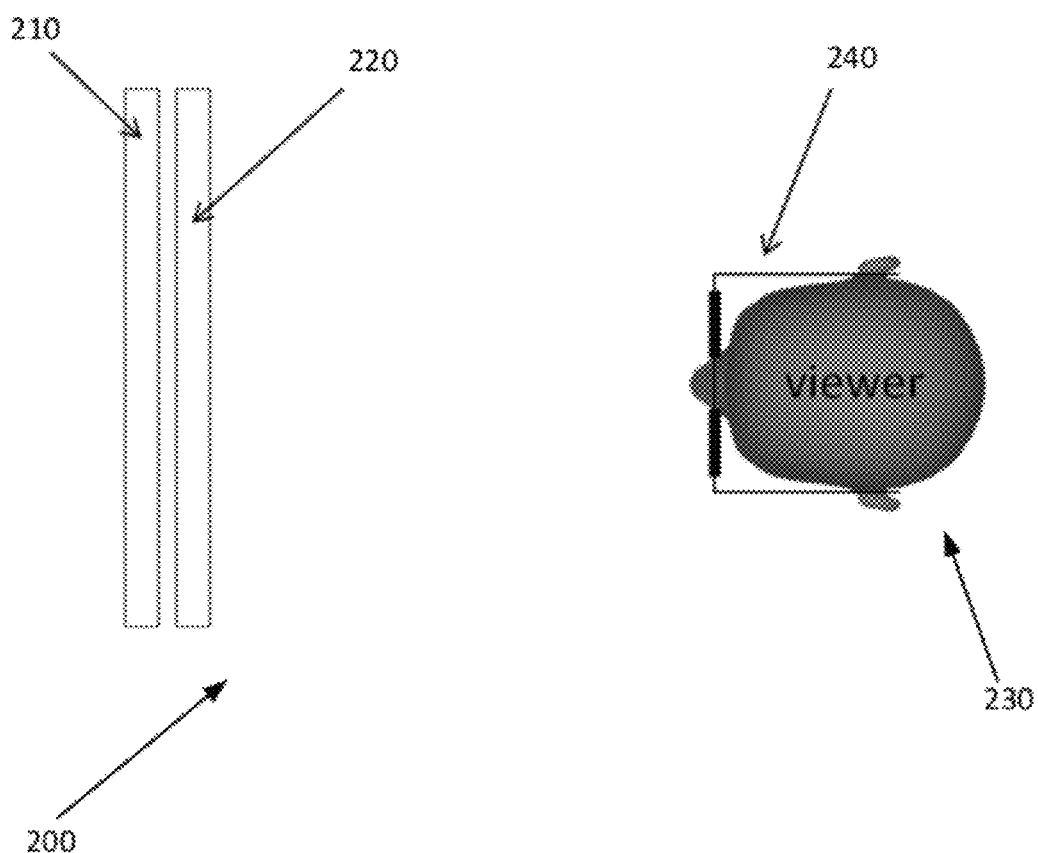
FIG. 2 is a schematic diagram of a top view of a stereoscopic display system that has a polarization control panel with which stereoscopic imagery may be viewed with passive eyewear, in accordance with the present disclosure.

FIG. 2 is a schematic diagram of a top view of a stereoscopic display system that has a polarization control panel with which stereoscopic imagery may be viewed with passive eyewear. In FIG. 2, the stereoscopic display system 200 may include a LCD 210, a polarization control panel ("PCP") 220, and a viewer 230 wearing polarization discriminating eyewear 240. Additionally, the stereoscopic display system 200 of FIG. 2 may be a RPD system. Similar to the aforementioned RPD systems, the stereoscopic display system 200 may include a fast LCD 210 which may alternately display left and right eye images that may be selectively polarized with an integral liquid crystal PCP 220. In one example, the transition speeds of the LCD may be approximately $1/120^{th}$ of a second. Additionally, the PCP 220 may include a LC modulator and compensated quarter-wave retardation film. (not illustrated in FIG. 2). Passive polarizing eyewear 240 may be worn by viewers 230 and the eyewear 240 may selectively block light from incorrect eye images. Stated differently, the eyewear 240 may include a left lens and a right lens in which the left lens may block right eye images from reaching the left eye of the viewer and the right lens may block left eye images from reaching the right eye of the viewer.

The approach of FIG. 2 is similar in concept to the RealD cinema system with the projector replaced by an LCD. An issue may arise with the RPD systems as LCDs may be slow to update and may be addressed line by line in a continuous scroll. Generally, due to this issue, viewing and/or correctly polarizing an entire settled image has not been possible.

Large Area Charge Redistribution

In one embodiment, a segmented modulator may be employed to address the previously discussed issues. Such segmented modulators may be as described in the above-referenced applications, U.S. application Ser. No. 12/853,274 and U.S. application Ser. No. 12/156,683. In one example, a large area LC modulator may be employed, however, the physical area of the large area LC modulator may be such that large capacitive loads may result and thus, the need to address significant charge redistribution.

Figure 3:
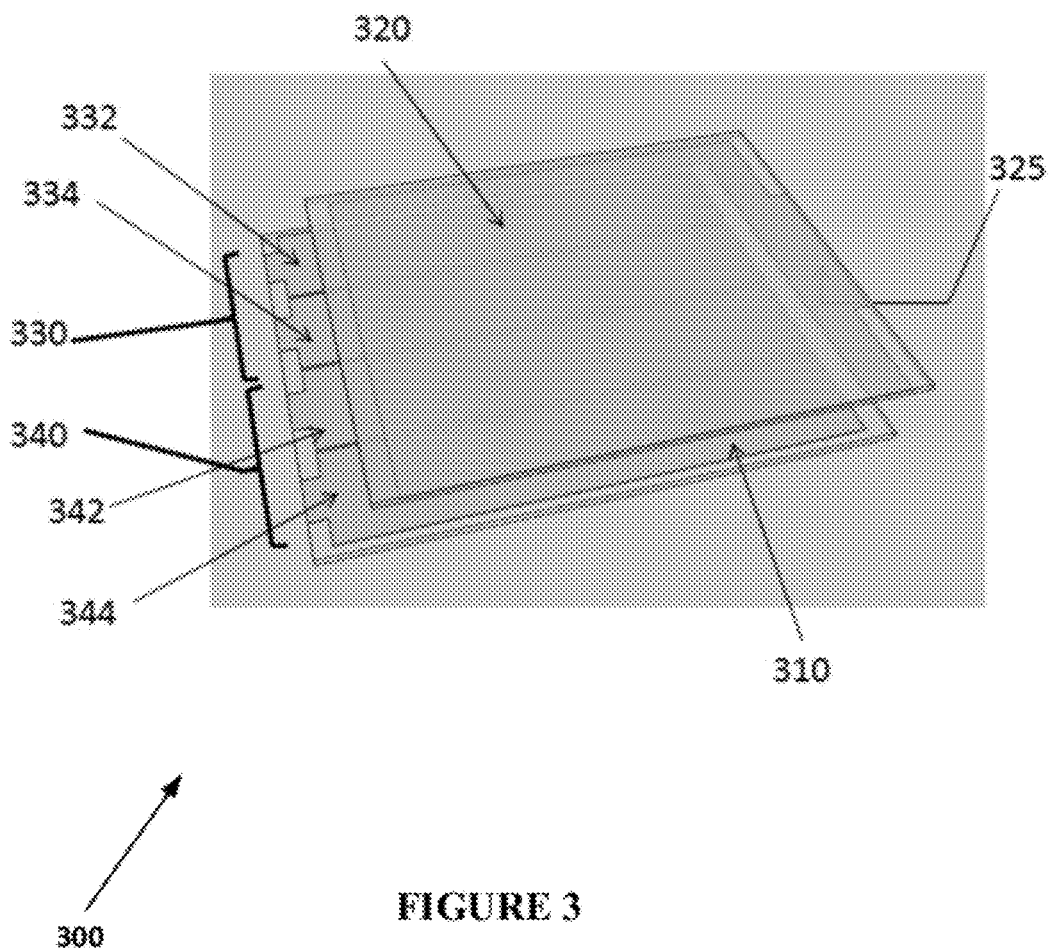
FIG. 3 is a schematic diagram of a segmented polarization modulation panel, in accordance with the present disclosure.

FIG. 3 is a schematic diagram of one embodiment of a segmented polarization control panel, illustrating a two segment LC modulator panel. LCDs may be referred to herein for discussion purposes only and not of limitation, as various displays may be employed including, but not limited to CRTs, projectors displays, OLEDs, plasmas, and so forth. In FIG. 3, the segmented LC modulator panel 300 includes a first substrate 310, a second substrate 320, a top electrode 325, a first segment 330, a second segment 340, a first electrode 332, a second electrode 334, a third electrode 342, and a fourth electrode 344. As shown in FIG. 3, a top electrode 325 may be common to both the first segment 330 and the second segment 340. Generally, the top electrode 325 may be common to all segments of a segmented PCP. Additionally, the top electrode 325 may be adjacent to the second substrate 320. The first and second substrate 110 and 120 respectively, may be various types of materials including, but not limited to, glass, a semiconductor such as silicon, an organic polymers such as polyethylene terephthalate ("PET"), and so forth. Further, the first and second substrates may form any size liquid crystal cell or panel, including small area liquid cells, or panels, large area liquid cells or panels such as big screen televisions, which may be greater than 23 inches on the diagonal.

Continuing the discussion of FIG. 3, the first segment 330 and the second segment 340 may be defined by a patterned bottom electrode. Each of the first and second segments 330 and 340 respectively may also be further subdivided into two approximately equal sized subsegments. As illustrated in FIG. 3, the first segment 330 may include the first subsegment or first electrode 332 and the second subsegment or second electrode 334. Likewise, the second segment 340 may include the third subsegment or third electrode 342 and the fourth subsegment or fourth electrode 344. Similar to the first and second segments, the first, second, third, and fourth electrodes 332, 334, 342, 344, respectively, may be defined by a patterned bottom electrode. Additionally, the first, second, third, and fourth electrodes 332, 334, 342, 334, respectively, as well as the top electrode 325 may be any transparent, conductive material such as Indium Tin Oxide or ITO. Generally, segments may be isolated from another, but may both be coupled to the top electrode. The top electrode may also be referred to herein as the common electrode for discussion purposes only and not of limitation. Although two polarization control segments, each with two subsegments or electrodes are shown in FIG. 3 for illustrative purposes, it should be appreciated that the number of polarization control segments and the number of subsegments or electrodes per polarization control segment may vary, and two polarization control segments each with two subsegments or electrodes are shown merely for illustrative and discussion purposes only.

Continuing the discussion of this embodiment, large area charge redistribution may be addressed by first dividing segments into subsegments which may be approximately equal sized and then driving each subsegment or electrode substantially synchronously with opposite polarity waveforms or driving each subsegment such that the waveforms may be substantially mirrored about the common electrode voltage. Additionally, the terms subsegments and electrodes may be used interchangeably for discussion purposes herein. Further, although the variation between subsegment voltages may be approximately zero, the variation may also be in the approximate range from zero to five volts. The average variation may also be close to zero or approximately zero. The average subsegment voltage remains very close to that of the common electrode, which may then be maintained with minimal charge redistribution across the common electrode. Stated differently, the subsegment voltage may be statistically close to zero. The resulting local charge distribution may reduce overall power consumption and also may improve image fidelity since temporal effects associated with macroscopic movement of charge onto and off the common plate may be avoided. Additionally, because charge may not have to be drawn across the common electrode, the common electrode may be manufactured with a thinner coating, less expensive and may be less expensive to manufacture.

Generally, a segment may be an independently controlled region of a modulator panel, which may be defined by the patterning of a transparent conductor on a single substrate. The number of segments may be determined by any number of factors, including, but not limited to, the panel line address rate, the frame time, number of display lines, the viewing LC period over which the net intensity does not visibly vary, the switching period of the PCP, and so forth. In one example, sixteen segments may be employed in twisted nematic LCD systems with substantially continuous illumination.

In another example, two segments may be employed for 240 Hz displays with modulated backlights. Again, the AC responding LCs may provide substantially equivalent optical performance for both subsegments within a segment with the possible exception of a very small physical boundary of each of the subsegments. Such physical boundaries may be on the order of approximately 10 microns. In one example, when viewing a display, such region boundaries of each of the subsegments may be virtually invisible to the viewer at a typical viewing distance of approximately greater than 500 mm. The region boundaries of the subsegments may be somewhat imperceptible to a viewer as each pixel of the display may be approximately fifty times larger than the region boundary of the subsegments in the case of approximately 50 inch diagonal display systems. Additionally, the subsegments and thus the boundaries may be oriented in any direction, and in on example, oriented horizontally which may minimize the sheet resistance between the subsegments, which in turn, may increase switching speeds and may reduce power. The boundaries of the subsegments may be maximized and may be various configurations including, but not limited to, substantially linear, curved, zig-zag, and so forth.

The switching speed of a PCP segment may depend on the response of the LC and the rate at which the voltage across the LC is applied. The voltage across the LC may be approximately determined by the product of the capacitance and series resistance (RC). In the example of a large area device, which may be greater than approximately 23 inches on the diagonal, the RC time constant may dominate. Driving smaller subsegments with substantially equal and opposite voltages may remove the need for charge to travel onto the common electrode from an external connection removing any associated resistances in the circuit. For a 50 inch display, a two segment PCP may reduce the voltage settling time by approximately thirty percent. Power may be approximately halved since charge may not travel along the common electrode.

Figure 4:
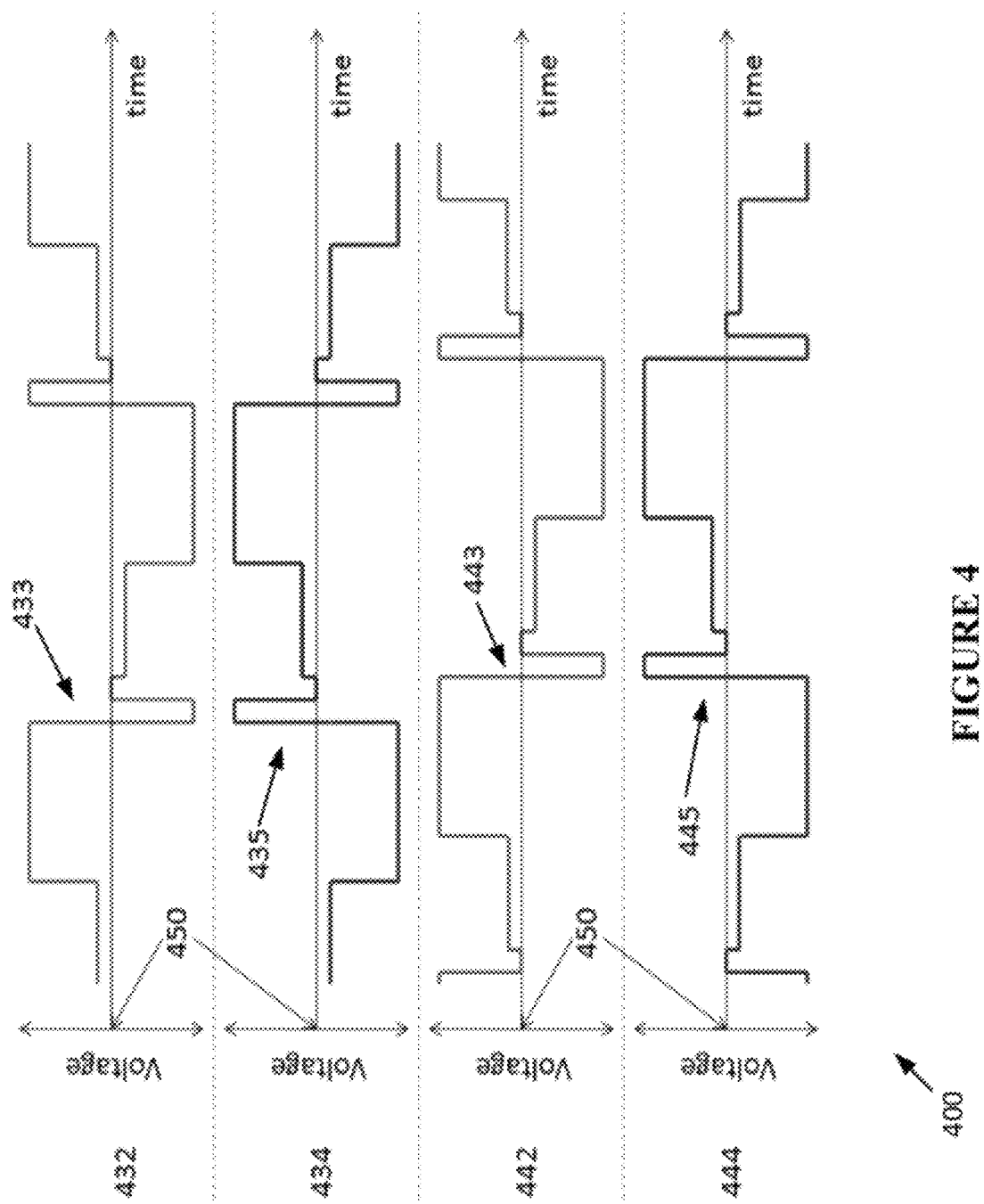
FIG. 4 is a waveform diagram of drive waveforms for the segmented polarization modulation panel of FIG. 3, in accordance with the present disclosure.

FIG. 4 is a waveform diagram of drive waveforms for the segmented polarization control panel of FIG. 3. In the waveform diagram 400 of FIG. 4, electrode 432 corresponds to electrode 332 of FIG. 3, electrode 434 corresponds to electrode 332 of FIG. 3, electrode 442 corresponds to electrode 342 of FIG. 3, and electrode 444 corresponds to electrode 444 of FIG. 3.

In one example, a separate drive may be applied to each of the four electrodes 432, 434, 442, and 444 as shown in FIG. 4 for a large pi-cell modulator panel. Generally, two sets of waveforms may be applied to a polarization control panel (PCP) and may be offset in relative phase as shown in FIG. 4. Stated differently, waveforms 433 and 435 may be offset in relative phase from waveforms 443 and 445. The waveforms 433 and 435 may be applied respectively to electrodes 432 and 434 and may correspond to a first modulation segment. The waveforms 433 and 435 may be mirrored about the common electrode voltage 450. The common electrode voltage 450 may be referred to as Vcom and may be approximately zero volts. Similarly, the waveforms 443 and 445 may be applied respectively to electrodes 442 and 444. The electrodes 442 and 444 may be associated with a second modulation segment and may also be mirrored about the common electrode voltage, Vcom, 450. In one embodiment, there may not be any correspondence between the two pairs of waveforms.

As previously discussed, field polarity inversion may be achieved by depositing more or less charge on the pixel electrode to give a voltage that swings to either side of the common electrode voltage. As shown in FIG. 4 waveform 433 may be applied to electrode 432 while waveform 435 may be applied to electrode 434, which illustrates a voltage on either side of the common electrode voltage 450. Also shown in FIG. 4, the average electrode voltage may remain close to that of the common electrode, which may then be maintained with minimal charge redistribution across the entire ITO layer. In example, the areas of the subsegments may be substantially similar, the drive waveforms applied to the subsegments may be symmetrical, and the subsegments may be driven substantially similarly from the same side, then the common electrode will remain at approximately zero volts.

Continuing the discussion of FIG. 4, a segmented liquid crystal modulator panel may be driven so that electrical crosstalk associated with capacitive coupling to a common electrode, may be substantially reduced and/or eliminated. As previously discussed with respect to FIG. 3, each modulator segment may be separated into two and driven substantially synchronously and out-of-phase. The field-polarity insensitive LC materials may yield a substantially identical optical response for each subsegment, while allowing current on the common electrode to flow between the subsegments. As a result power may be reduced and response times may be decreased in the approximate range of twenty to fifty percent.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of the embodiment(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A segmented polarization control panel, comprising:
a first subsegment of a first segment of a segmented polarization control panel; and
a second subsegment of the first segment of the segmented polarization control panel,
wherein the first subsegment is driven with a first waveform and the second subsegment is driven with a second waveform, further wherein the magnitude of the second waveform is primarily determined from the first waveform and the magnitude of the second waveform is substantially similar in magnitude to the first waveform and opposite in polarity to the first waveform, wherein the first and second waveforms are applied at substantially the same time, further wherein the first and second subsegments are driven to selectively polarize output light.

2. The segmented polarization control panel of claim 1, further comprising a second segment of the segmented polarization control panel, wherein the second segment comprises a third subsegment and a fourth subsegment.

3. The segmented polarization control panel of claim 2, further comprising a common electrode, wherein the common electrode is coupled to the first segment and the second segment of the segmented polarization control panel.

4. The segmented polarization control panel of claim 3, wherein the first segment and the second segment of the segmented polarization control panel are electrically isolated from one another.

5. The segmented polarization control panel of claim 3, further comprising driving the first subsegment of the first segment and the second subsegment of the first segment such that the waveforms are substantially mirrored about the common electrode voltage such that absolute values of the waveforms with respect to the common electrode voltage are substantially equal at a given time.

6. The segmented polarization control panel of claim 2, further comprising driving the first subsegment and the second subsegment such that the first subsegment exhibits substantially equivalent optical performance to the second subsegment.

7. The segmented polarization control panel of claim 2, further comprising driving the first subsegment and the second subsegment substantially synchronously.

8. The segmented polarization control panel of claim 2, wherein the first subsegment is approximately the same size as the second subsegment.

9. A method for driving a segmented modulator panel, comprising:
driving a first subsegment of a first segment of the segmented modulator panel to selectively polarize output light, with an opposite polarity from a second subsegment of the first segment, wherein the first subsegment comprises one of a first row of the first segment and a first column of the first segment, wherein the magnitude of the second waveform is primarily determined from the first waveform and the magnitude of the second waveform is substantially similar in magnitude to the first waveform and opposite in polarity to the first waveform, wherein the first and second waveforms are applied at substantially the same time; and
driving the first segment of the segmented modulator panel substantially synchronously and out of relative phase with a second segment of the segmented modulator panel.

10. The method for driving a segmented modulator panel of claim 9, further comprising driving the first subsegment and the second subsegment such that the first subsegment exhibits substantially equivalent optical performance to the second subsegment.

11. The method for driving a segmented modulator panel of claim 9, further comprising driving the first subsegment and the second subsegment substantially synchronously.

12. The method for driving a segmented modulator panel of claim 9, further comprising driving the first subsegment of the first segment and the second subsegment of the first segment with waveforms that are substantially mirrored about a common electrode voltage such that absolute values of the waveforms with respect to the common electrode voltage are substantially equal at a given time.

13. The method for driving a segmented modulator panel of claim 9, wherein the first segment and a second segment of the segmented modulator panel are electrically isolated from one another.

14. The method for driving a segmented modulator panel of claim 13, wherein the first segment and the second segment of the segmented modulator panel are coupled to a common electrode.

15. The method for driving a segmented modulator panel of claim 9, wherein the first subsegment and the second subsegment are approximately the same size.

16. A segmented modulator panel, comprising:
a first segment of the segmented modulator panel; and
a second segment of the segmented modulator panel, wherein the first and second segments of the segmented modulator panel are driven substantially synchronously to selectively polarize output light, wherein the magnitude of the second waveform is primarily determined from the first waveform and the magnitude of the second waveform is substantially similar in magnitude to the first waveform and opposite in polarity to the first waveform, wherein the first and second waveforms are applied at substantially the same time.

17. The segmented modulator panel of claim 16, wherein the first segment of the modulator panel comprises a first subsegment and a second subsegment and the second segment of the modulator panel comprises a third subsegment and a fourth subsegment.

18. The segmented modulator panel of claim 16, wherein the first segment and the second segment are electrically isolated from one another.

19. The segmented modulator panel of claim 16, wherein the first subsegment and the second subsegment are driven with waveforms that are substantially mirrored about a common electrode voltage such that absolute values of the waveforms with respect to the common electrode voltage are substantially equal at a given time.

* * * * *